(12) United States Patent
Panigrahy et al.

(10) Patent No.: US 8,862,528 B2
(45) Date of Patent: Oct. 14, 2014

(54) PREDICTING VALUES IN SEQUENCE

(76) Inventors: Rina Panigrahy, San Ramon, CA (US);
Mikhail Kapralov, Stanford, CA (US)

( * ) Notice: Subject to any disclaimer, the term of this patent is extended or adjusted under 35 U.S.C. 154(b) by 477 days.

(21) Appl. No.: 13/105,908

(22) Filed: May 12, 2011

(65) Prior Publication Data

US 2012/0288036 A1 Nov. 15, 2012

(51) Int. Cl.
*G06N 5/00* (2006.01)
*H04L 27/06* (2006.01)
*G06N 99/00* (2010.01)

(52) U.S. Cl.
CPC ............... *H04L 27/06* (2013.01); *G06N 99/00* (2013.01)
USPC ........................................................ 706/45

(58) Field of Classification Search
None
See application file for complete search history.

(56) References Cited

U.S. PATENT DOCUMENTS

| | | |
|---|---|---|
| 7,856,548 B1 | 12/2010 | Nelson et al. |
| 2009/0268810 A1 | 10/2009 | Dai |

OTHER PUBLICATIONS

Stephen Bay, "Combining Nearest Neighbor Classifiers Through Multiple Feature Subsets", 1998, ICML, pp. 1-9.*
Ting et al., "Model Combination in the Multiple-Data-Batches Scenario", 1997, Machine Learning, pp. 250-265.*
Bouchachia et al., "Ensemble Learning for Time-Series Prediction", 2008, pp. 1-8.*
Garg et al., "Bayesian Networks as Ensemble of Classifier", 2002, Pattern Recognition; pp. 1-6.*
Clarke et al., "Adaptive Combined Average Predictors", Nov. 29, 2010, pp. 1-31.*
Wichard et al., "Time Series Prediction with Ensemble Models", 2004, pp. 1-6.*
Schwaerzel et al., "Improving the Accuracy of Financial Time Series Prediction Using Ensemble Networks and High Order Statistics", 1997, Neural Networks, pp. 1-6.*
Bursteinas, "Distributed Learning from Concept Descriptions of Linear Unstable Classifiers", Dec. 2003, pp. 1-219.*
Cover et al., "Compound Bayes Predictors for Sequences with Apparent Markov Structure", Jun. 1977, IEEE Transaction on Systems, Man, and Cybernetics, vol. SMC-7 No. 6, pp. 421-424.*
Dariusz Brzezinski, "Mining Data Streams with Concept Drift", 2010, pp. 1-89.*
Stefan Zemke, "Data Mining for Prediction—Financial Series Case", Dec. 2003, pp. 1-173.*
Madzarov et al., "A Multi-Class SVM Classifier Utilizing Binary Decision Tree", Informatic 33, 2009, pp. 233-241.*

(Continued)

*Primary Examiner* — Jeffrey A Gaffin
*Assistant Examiner* — Paulinho E Smith
(74) *Attorney, Agent, or Firm* — Micah Goldsmith; Glen Johnson; Micky Minhas

(57) ABSTRACT

Multiple data prediction strategies are received. Each data prediction strategy may predict a next data value in a sequence of data values with a corresponding confidence value. Rather than rely on a single prediction strategy, the predictions of each of the data prediction strategies are linearly combined to generate a single prediction that is more accurate and has a lower overall loss than any of the individual prediction strategies. Further, a deviation is calculated based on the values in the sequence of values that have been observed so far using a weighted sum that favors more recent values in the sequence over less recent values in the sequence. A prediction of the next value in the sequence is generated based on the combined strategies and the calculated deviation.

16 Claims, 5 Drawing Sheets

(56) References Cited

OTHER PUBLICATIONS

Freund, Yoav., "Predicting a Binary Sequence Almost as Well as the Optimal Biased Coin", Retrieved at http://citeseerx.ist.psu.edu/viewdoc/download?doi=10.1.1.51.3156&rep=rep1&type=pdf, Apr. 3, 1996, pp. 24.*

Haussler, et al., "Tight worst-case loss bounds for predicting with expert advice", Retrieved at << http://citeseerx.ist.psu.edu/viewdoc/download?doi=10.1.1.38.8862&rep=rep1&type=ps >>, Nov. 3, 1994, pp. 28.

Haussler, et al., "Sequential Prediction of Individual Sequences Under General Loss Functions", Retrieved at << http://users.soe.ucsc.edu/~manfred/pubs/J42.pdf>>, IEEE Transactions on Information Theory, vol. 44, No. 5, Sep. 1998, pp. 1906-1925.

Agarwal, et al., "Efficient Algorithms for Online Game Playing and Universal Portfolio Management", Retrieved at << http://citeseerx.ist.psu.edu/viewdoc/download?doi=10.1.1.89.7655&rep=rep1&type=pdf >>, Electronic Colloquium on Computational Complexity (ECCC), vol. 13, No. 033, 2006, pp. 1-13.

Feder, et al., "Universal Prediction of Individual Sequences", Retrieved at << http://citeseerx.ist.psu.edu/viewdoc/download;jsessionid=2C3371B652EADD658ECA1755F369C1CA?doi=10.1.1.129.2716&rep=rep1&type=pdf >>, IEEE Transactions on Information Theory, vol. 38, No. 4, Jul. 1992, pp. 1258-1270.

Cesa-Bianchi, et al., "On-line Prediction and Conversion Strategies", Retrieved at << http://citeseerx.ist.psu.edu/viewdoc/download?doi=10.1.1.88.699&rep=rep1&type=pdf >>, Machine Learning, vol. 25, No. 01, Oct. 1996, pp. 1-42.

Freund, et al., "Using and combining predictors that specialize", Retrieved at << http://cseweb.ucsd.edu/~yfreund/papers/SpecializedExperts.pdf >>, 29th Annual Symposium on Theory of Computing, May 4-6, 1997, pp. 1-10.

Hazan, et al., "Logarithmic Regret Algorithms for Online Convex Optimization", Retrieved at << http://ie.technion.ac.il/~ehazan/papers/colt.pdf >>, Machine Learning, vol. 69, No. 2-3, Dec. 2007, pp. 15.

Auer, et al., "Finite-Time Analysis of the Multiarmed Bandit Problem", Retrieved at << http://homes.dsi.unimi.it/~cesabian/Pubblicazioni/ml-02.pdf >>, Machine Learning, vol. 47, No. 2-3, May-Jun. 2002, pp. 235-256.

Auer, et al., "The Nonstochastic Multi-Armed Bandit Problem", Retrieved at << http://citeseerx.ist.psu.edu/viewdoc/download;jsessionid=418036D58C370C9D040E0EE2E5CCCB09?doi=10.1.1.21.8735&rep=rep1&type=pdf >>, SIAM Journal on Computing, vol. 32, No. 1, 2003, pp. 1-33.

Awerbuch, et al., "Adaptive Routing with End-to-End Feedback: Distributed Learning and Geometric Approaches", Retrieved at << http://www.cs.jhu.edu/~baruch/RESEARCH/Research_areas/Collaboration+Learning/STOC%202004/p20-awerbuch.pdf >>, In Proceedings 36th STOC, 2004, pp. 9.

Bousquet, et al., "Tracking a Small Set of Experts by Mixing Past Posteriors", Retrieved at << http://jmlr.csail.mit.edu/papers/volume3/bousquet02b/bousquet02b.pdf >>, Journal of Machine Learning Research, vol. 03, 2002, pp. 363-396.

Cesa-Bianchi, et al., "Prediction, Learning and Games", Retrieved at << http://homes.dsi.unimi.it/~cesabian/predbook/errata.pdf >>, Sep. 8, 2006, pp. 1-3.

Chaudhuri, et al., "A Parameter-free Hedging Algorithm", Retrieved at << http://books.nips.cc/papers/files/nips22/NIPS2009_1110.pdf >>, 2009, pp. 1-9.

Cover, Thomas M., "Universal Portfolios", Retrieved at << http://www.stanford.edu/~cover/papers/paper93.pdf >>, Mathematical Finance, vol. 01, No. 1, Jan. 1991, pp. 1-29.

Dani, et al., "Robbing the Bandit: Less Regret in Online Geometric Optimization against an Adaptive Adversary", Retrieved at << http://citeseerx.ist.psu.edu/viewdoc/download?doi=10.1.1.118.1342&rep=rep1&type=pdf >>, Nov. 12, 2005, pp. 1-14.

Even-Dar, et al., "Regret to the Best vs. Regret to the Average", Retrieved at << http://www.math.tau.ac.il/~mansour/papers/07-colt.pdf >>, Machine Learning, vol. 72, No. 1-2, Aug. 2008, pp. 233-247.

Flaxman, et al., "Online Convex Optimization in the Bandit Setting: Gradient Descent without a Gradient", Retrieved at << http://people.cs.uchicago.edu/~kalai/papers/bandit/bandit.pdf >>, Oct. 17, 2004, pp. 385-394.

Freund, Yoav., "Predicting a Binary Sequence Almost as Well as the Optimal Biased Coin", Retrieved at << http://citeseerx.ist.psu.edu/viewdoc/download?doi=10.1.1.51.3156&rep=rep1&type=pdf >>, Apr. 3, 1996, pp. 24.

Hazan, et al., "Extracting Certainty from Uncertainty: Regret Bounded by Variation in Costs", Retrieved at << http://www.cs.princeton.edu/~satyen/papers/var-journal.pdf >>, 2008, pp. 1-23.

Hazan, et al., "On Stochastic and Worst-Case Models for Investing", Retrieved at << http://citeseerx.ist.psu.edu/viewdoc/download?doi=10.1.1.156.9572&rep=rep1&type=pdf >>, Processing Systems (NIPS), Dec. 2009, pp. 1-9.

Hazan, et al., "Efficient Learning Algorithms for Changing Environments", Retrieved at << http://ie.technion.ac.il/~ehazan/papers/adap-icml2009.pdf>>, The 26th Annual International Conference on Machine Learning held in conjunction with the 2007 International Conference on Inductive Logic Programming, Jun. 14-18, 2009, pp. 8.

Herbster, et al., "Tracking the Best Expert", Retrieved at << http://citeseerx.ist.psu.edu/viewdoc/download?doi=10.1.1.51.4839&rep=rep1&type=pdf>>, Machine Learning—Special issue on context sensitivity and concept drift, vol. 32, No. 2, Aug. 1998, pp. 1-29.

Kalai, et al., "Efficient Algorithms for Universal Portfolios", Retrieved at << http://citeseerx.ist.psu.edu/viewdoc/download?doi=10.1.1.10.946&rep=rep1&type=pdf >>, 41st Annual Symposium on Foundations of Computer Science, 2000, pp. 1-18.

Kalai, et al., "Efficient Algorithms for Online Decision Problems", Retrieved at << http://citeseerx.ist.psu.edu/viewdoc/download?doi=10.1.1.91.6724&rep=rep1&type=pdf>>, Journal of Computer and System Sciences—Special issue: Learning theory, vol. 71, No. 3, Oct. 2005, pp. 291-307.

Kleinberg, et al., "Sharp Dichotomies for Regret Minimization in Metric Spaces", Retrieved at << https://www.siam.org/proceedings/soda/2010/SODA10_068_kleinbergr.pdf >>, Proceedings of the Twenty-First Annual ACM-SIAM Symposium on Discrete Algorithms, SODA, Jan. 17-19, 2010, pp. 827-846.

Kleinberg, et al., "Multi-Armed Bandits in Metric Spaces", Retrieved at << http://www.cs.cornell.edu/~rdk/papers/bandits-lip.pdf >>, Symposium on Theory of Computing Conference, May 17-20, 2008, pp. 10.

Littlestone, et al., "The Weighted Majority Algorithm", Retrieved at << http://www.dklevine.com/archive/refs4575.pdf >>, Information and Computation, vol. 108, No. 2, Feb. 1, 1994, pp. 256-261.

Tsitsiklis, John N., "A Short Proof of the GITTINS Index Theorem", Retrieved at << http://www.mit.edu/~jnt/Papers/J048-94-jnt-gittins.pdf >>, The Annals of Applied Probability, vol. 04, No. 1, 1994, pp. 194-199.

Vovk, V., "A Game of Prediction with Expert Advice", Retrieved at << http://seed.ucsd.edu/Onlinecrs/rsrc/Onlinecrs/LessonNo7/science.pdf >>, 8th Annual Conference on Computational Learning Theory, Jul. 5-8, 1995, pp. 153-173.

Zinkevich, Martin., "Online Convex Programming and Generalized Infinitesimal Gradient Ascent", Retrieved at << http://webdocs.cs.ualberta.ca/~maz/publications/ICML03.pdf >>, Machine Learning, Proceedings of the Twentieth International Conference (ICML), Aug. 21-24, 2003, pp. 8.

* cited by examiner

PREDICTING VALUES IN SEQUENCE

BACKGROUND

Data prediction is a useful tool with applications for a variety of industries. Examples of data prediction include predicting a next bit in a sequence of bits, or a next value in a sequence of values. Such data prediction techniques may have a variety of uses and applications including predicting future load on computing devices, predicting future prices of stocks and commodities, and predicting click-through rates for online advertisements, for example.

An objective of data prediction is to predict data with a high accuracy and a low overall loss. The loss of a data prediction algorithm is a measure of the number of times the algorithm predicts a data value correctly versus the number of times the algorithm predicts a data value incorrectly. Current methods for data prediction are deficient with respect to both accuracy and overall loss.

SUMMARY

Multiple data prediction strategies are received. Each data prediction strategy may predict a next data value in a sequence of data values with a corresponding confidence value. Rather than rely on a single prediction strategy, the predictions of each of the data prediction strategies are linearly combined to generate a single prediction that is more accurate and has a lower overall loss than any of the individual prediction strategies. Further, a deviation is calculated based on the values in the sequence of values that have been observed so far using a weighted sum that favors more recent values in the sequence over less recent values in the sequence. A prediction of the next value in the sequence is generated based on the combined strategies and the calculated deviation.

In an implementation, a sequence of values is received by a computing device. Each value in the sequence of values has an associated time. A deviation of the values of the sequence of values is determined based on the time associated with each value by the computing device. A prediction is generated based on the determined deviation by the computing device. The prediction includes a predicted next value in the sequence of values and a confidence value. The prediction is provided by the computing device.

In an implementation, value prediction strategies are received at a computing device. A sequence of values is received at the computing device. For each value prediction strategy, a prediction is generated based on the sequence of values by the computing device. The generated predictions are combined to form a combined prediction by the computing device. The combined prediction is provided by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
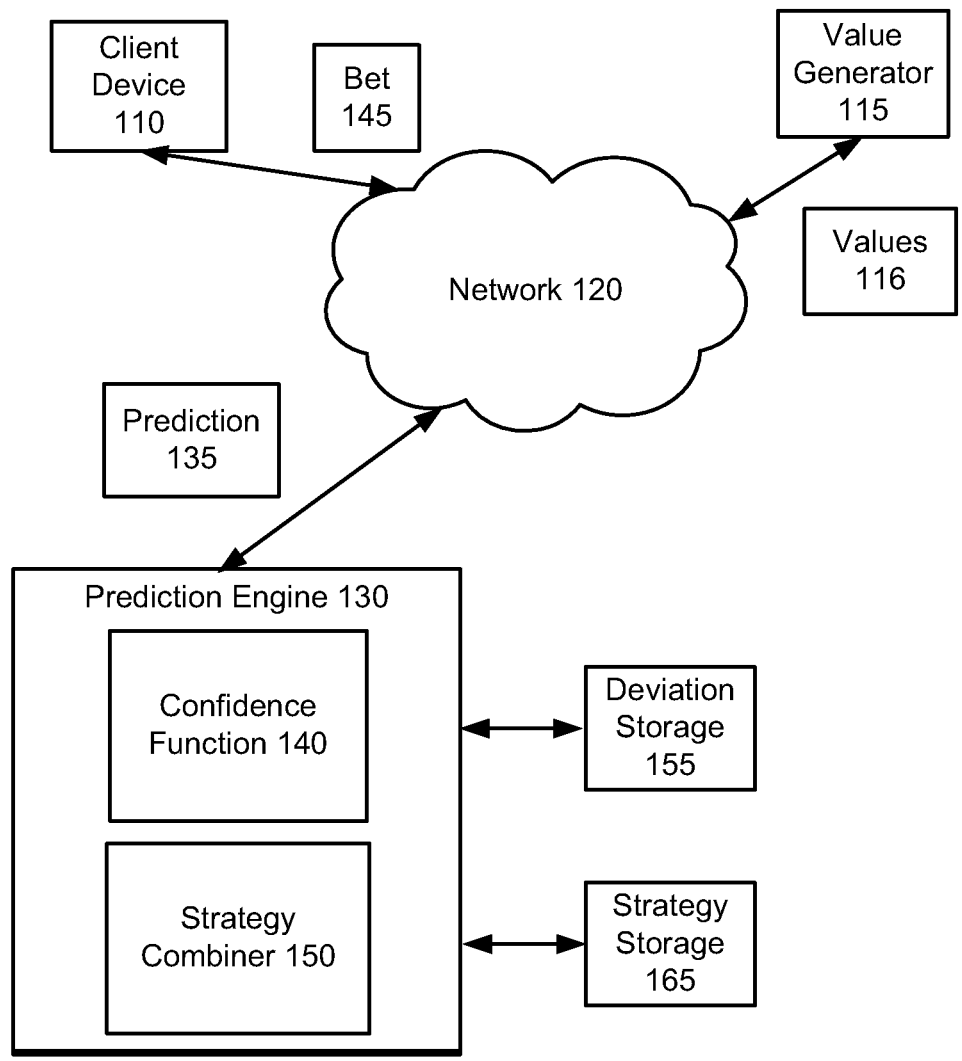
FIG. 1 is an illustration of an example environment for predicting values.

FIG. 1 is an illustration of an example environment 100 for predicting values. The environment 100 may include a client device 110, a value generator 115, and a prediction engine 130 in communication with one another through a network 120. The network 120 may be a variety of network types including the public switched telephone network (PSTN), a cellular telephone network, and a packet switched network (e.g., the Internet). Although shown as comprised within separate devices over a network 120, depending on the implementation, the client device 110, the value generator 115, and/or the prediction engine 130 may be comprised within a single computing device, or one or more devices that do not communicate over the network 120.

In some implementations, the client device 110 may include a desktop personal computer, workstation, laptop, PDA (personal digital assistant), smart phone, cell phone, or any WAP (wireless application protocol) enabled device or any other computing device capable of interfacing directly or indirectly with the network 120. A client device 110 may be implemented using a general purpose computing device such as the computing device 500 described with respect to FIG. 5, for example. While only one client device 110 is shown, it is for illustrative purposes only; multiple client devices 110 may be supported.

The value generator 115 may generate values 116. The values 116 may include a variety of values including, but not limited to, bit values (e.g., 1 or 0), real numbers, integers, or any other type of values. The values 116 generated by the value generator 115 may form a sequence of values 116, and each value in the sequence of values 116 may have an associated time that reflects the time at which the value was generated by the value generator 115. The values 116 of a sequence of values may be ordered based on the time associated with each value.

The values 116 generated by the value generator 115 may represent a variety of values produced by value generating entities. For example, the values 116 may represent the prices of a particular stock, commodity, or other traded good or service at a particular time. In another example, the values 116 may represent a predicted load on a computer system, or a volume of traffic at a particular day or time. Other real world values may be represented by the values 116.

The prediction engine 130 may receive a sequence of values 116 from the value generator 115, and based on the values 116 and the times associated with the values 116, generate a prediction 135. In some implementations, a prediction 135 may include a predicted next value in the sequence of values 116, and a confidence value associated with the predicted next value. The confidence value may be a percentage that represents the likelihood that the predicted next value will match an actual next value generated by the value generator 115. The prediction engine 130 may be implemented using a general purpose computing device such as the computing device 500.

In some implementations, the predictions may be generated by the prediction engine 130 according to one or more prediction strategies. The prediction strategies may be stored in a strategy storage 165.

The client device 110 may receive a prediction 135 from the prediction engine 130, and based on the prediction 135, may generate a bet 145 on the next value generated by the value generator 115. The amount of the generated bet 145 may be proportional to the confidence value of the prediction 135. For example, where the value generator 115 generates values 116 corresponding to the price of a stock at an associated time, the prediction 135 may be a prediction of the price of the stock at the associated time. The client device 110 may generate a bet 145 by buying or selling some amount of the stock according to the prediction 135.

The prediction engine 130 may determine a prediction 135 based on the values 116 that have been generated by the value generator 115 and a value prediction strategy. In particular, the prediction engine 135 may calculate a deviation for the sequence of values generated by the value generator 115. The calculated deviation may be stored by the prediction engine 135 in a deviation storage 155.

Where the generated values 116 are bits, the prediction engine 135 may determine the deviation by keeping a sum of the number of one values and the number of zero values generated by the value generator 115. For example, the deviation may be incremented by the prediction engine 135 for every bit with a value of one, and decremented by the prediction engine 135 for every bit with a value of zero.

The prediction engine 135 may favor recently generated values in the calculation of the deviation over less recently generated values. Accordingly, the prediction engine 135 may weight each value of a sequence of values 116 in the deviation function so that more recent values are weighted higher than the less recent values.

In some implementations, the values 116 in the deviation calculation may be weighted using what is referred to herein as a discount factor. The discount factor $\rho$ may be selected by a user or administrator such that $\rho = 1 - 1/n$ where n is the number of values 116 in the sequence of values 116 generated by the value generator 115 so far. Using the discount factor $\rho$, the deviation $x_t$ at a time t may be calculated using formula (1) where $b_j$ is the $j^{th}$ value in the sequence of values 116:

$$x_t = \Sigma_{j=1}^{t} \rho^{t-j} b_j \qquad (1)$$

The prediction engine 130 may generate a prediction 135 from the deviation $x_t$ stored in the deviation storage 155 using a confidence function 140. In some implementations, the confidence function 140 may be a continuous odd function. Other types of functions may be used.

The confidence function 140 may generate a predicted next value and a confidence level for the prediction based on the deviation $x_t$. In some implementations, the prediction engine 130 may select a confidence function based on a desired bound on the amount of loss for the predictions generated using the confidence function 140. Other methods for selecting a confidence function 140 may be used.

In implementations where the values 116 are bit values, the confidence function 140 $g(x)$ may be implemented by the prediction engine 130 according to formula (2) where Z is the desired bound on the loss and T is the time associated with the most recently generated value:

$$g(x) = Ze^{x^2/(4T)} \qquad (2)$$

The prediction engine 130 may receive a sequence of values 116 from the value generator 115. Each value in the sequence may have been previously generated by the value generator 115 at a particular time. The prediction engine 130 may determine the deviation of the values 116 of the sequence of values based on the times associated with each of the values in the sequence. In some implementations, the prediction engine 130 may calculate the deviation using formula (1) described above. Other methods for calculating the deviation of the sequence of values may be used.

The prediction engine 130 may use the determined deviation to generate a prediction 135. The prediction engine 130 may generate the prediction 135 using the determined deviation and the confidence function 140. The prediction 135 may include a confidence value and a predicted next value to be generated by the value generator 115.

In implementations where the generated values 116 are bit values, the prediction 135 may include a confidence value with either a positive or negative sign. A positive confidence value may indicate a predicted value of a one, and a negative confidence value may indicate a predicted value of a zero, or vice versa.

The prediction engine 130 may provide the generated prediction 135 to the client device 110 through the network 120. The client device 110 may then place a bet 145 on the next generated value by the value generator 115 according to the prediction 135. The value generator 115 may then generate the next value and the client device 110 may receive a payout based on the success or failure of the prediction 135.

The prediction engine 130 may update the determined deviation based on the value generated by the value generator 115. The prediction engine 130 may then generate a prediction 135 for the next value that will be generated by the value generator 115. The prediction engine 130 may continue to generate predictions based on updated deviations.

As described above, the prediction engine 130 may generate predictions according to one or more prediction strategies from the strategy storage 165. For example, two examples of prediction strategies for predicting generated bit values 116 may be a strategy that always predicts a generated value of one and a strategy that always predicts a generated value of zero. In some implementations, the particular discount factor used to calculate the deviation may be dependent on the strategy used by the prediction engine 130.

The prediction engine 130 may further include a strategy combiner 150. The strategy combiner 150 may combine one or more predictions each generated using a different strategy from the strategy storage 165. The combined prediction 135 may then be provided to the client device 110.

In some implementations, the strategy combiner 150 may combine two predictions generated using strategies S1 and S2 using a linear combination of predictions generated using the two strategies. In some implementations, the strategy combiner 150 may combine the predictions into a combined prediction S' using formula (3) where g is the confidence function 140:

$$S' = S1 + g(S2 - S1) \times (S2 - S1) \qquad (3)$$

The strategy combiner 150 may further combine the predictions generated using multiple strategies from the strategy storage 165. In some implementations, the strategy combiner 150 may combine the predictions by first combining two predictions as described above using formula (3) to form a combined prediction 135. The strategy combiner 150 may then combine the combined prediction 135 with another prediction generated using a different strategy from the strategy storage 165 to form a new combined prediction 135. The strategy combiner 150 may continue to combine the combined prediction 135 with a prediction generated from strategies from the strategy storage 165 until some or all of the strategies have been used to generate the predictions.

In some implementations, the strategy combiner 150 may combine the predictions generated using the strategies from the strategy storage 165 by generating a binary tree using the predictions generated using each strategy. A binary tree is a tree with a plurality of nodes where each node has at most two child nodes. A node with no child nodes is referred to as a leaf node. The strategy combiner 150 may generate the binary tree with a leaf node for each prediction generated from the strategies in the strategy storage 165. The strategy combiner 150 may then recursively apply formula (3) described above to each node of the binary tree to generate the combined prediction 135 from the strategies. Any method for constructing a binary tree may be used.

Figure 2:
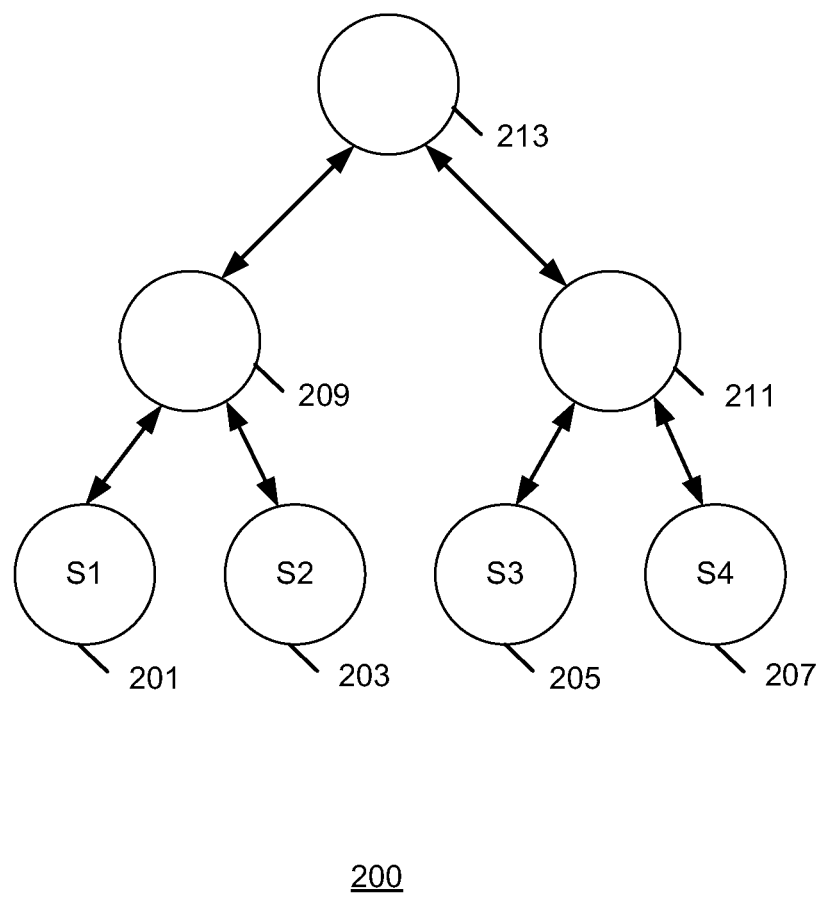
FIG. 2 is an illustration of an example binary tree used to combine predictions from multiple prediction strategies.

For example, FIG. 2 is an illustration of an example binary tree 200 generated by the strategy combiner 150 using predictions generated from four strategies S1, S2, S3, and S4 from the strategy storage 165. The binary tree 200 has four leaf nodes 201, 203, 205, and 207 corresponding to the predictions generated according to each of the strategies S1, S2, S3, and S4, respectively. The binary tree 200 has two internal nodes 209 and 211, and a root node 213.

The strategy combiner 150 may combine the predictions for each of the strategies S1, S2, S3, and S4 by applying an iteration of formula (3) to the root node 213. Because neither of the child nodes (i.e., nodes 209 and 211) of the root node 213 are leaf nodes, the strategy combiner 150 may recursively apply iterations of formula (3) to the nodes 209 and 211.

The iteration of formula (3) applied to the node 209 may combine the predictions associated with the strategies S1 and S2 represented by the leaf nodes 201 and 203 to form a combined prediction 135 based on the combined strategies S1 and S2. The strategy combiner 150 may similarly apply formula (3) to the node 211 to form the combined strategy S3S4.

The combined predictions S1S2 and S3S4 may be passed upwards to the iteration of formula (3) applied to the root node 213, where the strategy combiner 150 may combine the predictions using formula (3) to form the combined prediction S1S2S3S4. The combined predictions may then be provided by the prediction engine 130 as the prediction 135.

Figure 3:
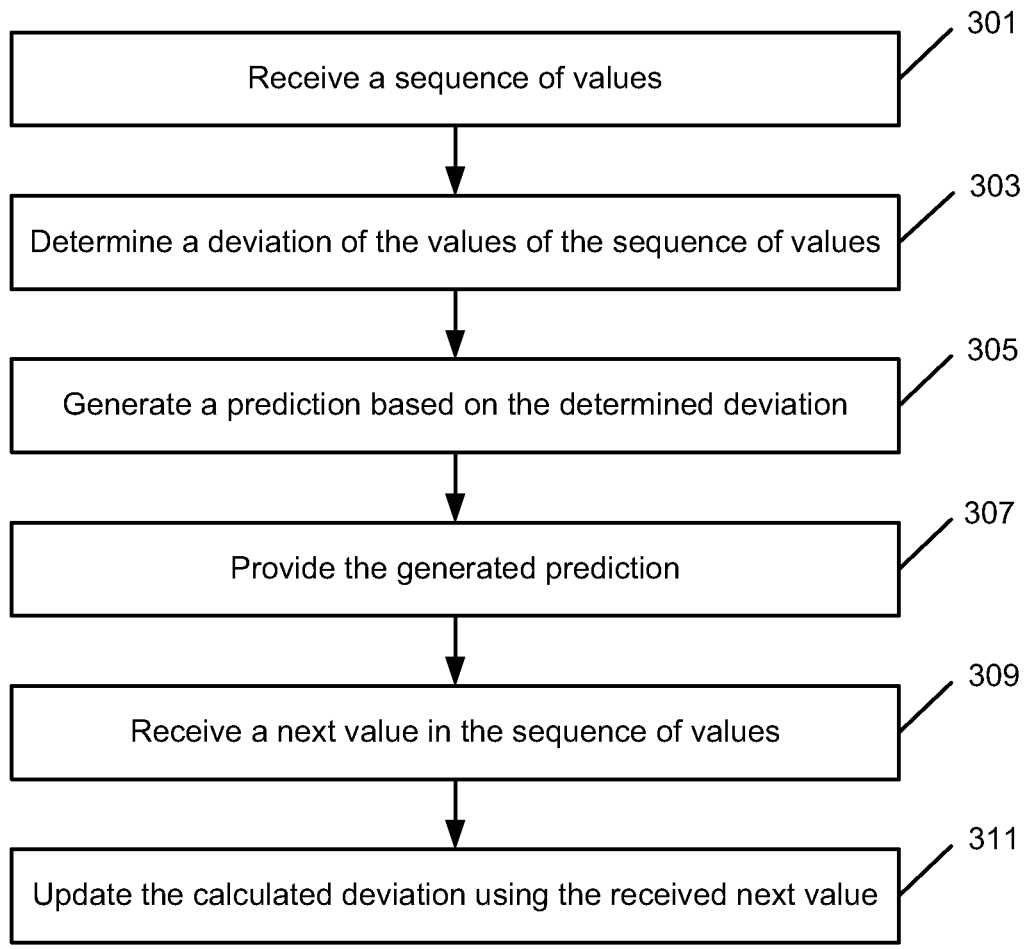
FIG. 3 is an operational flow of an implementation of a method for predicting a next value in a sequence of values.

FIG. 3 is an operational flow of an implementation of a method for predicting a next value in a sequence of values. The method 300 may be implemented by the prediction engine 130, for example.

A sequence of values is received at 301. The sequence of values 116 may be received by the prediction engine 130 from a value generator 115. Each value in the sequence of values 116 may have an associated time. The time associated with a value may be an indication of the time at which the value was generated by the value generator 115. In some implementations, the values 116 may be bit values such as ones and zeros. However, other values may also be supported.

A deviation of the values in the sequence of values is determined at 303. The deviation of the values may be determined by the prediction engine 130 from the sequence of values. In some implementations, the deviation may be a geometric sum of the values of the sequence of values. Where the values 116 are bit values, a 1 may be added to the deviation for each one bit value and a −1 may be added to the deviation for each zero bit value.

In some implementations, each value in the geometric sum may be weighted based on the time associated with each value. For example, values 116 having more recent times may be weighted higher than values 116 having less recent times. The weights may be based on a discount factor. The prediction engine 130 may calculate the deviation using formula (1) described above. Other methods for calculating the deviation of a sequence of values may also be used.

A prediction is generated based on the determined deviation at 305. The prediction 135 may be generated by the prediction engine 130 based on the determined deviation. The prediction 135 may include a predicted next value that will be generated by the value generator 115 and a confidence level for the predicted next value. In some implementations, the prediction 135 may be generated by the prediction engine 130 using the determined deviation and the confidence function 140. An example confidence function 140 is shown by formula (2) described above. Other confidence functions may also be used.

The generated prediction is provided at 307. The generated prediction 135 may be provided by the prediction engine 130 to a client device 110. The client device 110 may then generate a bet 145 on the next value according to the prediction 135. Alternatively or additionally, the prediction engine 130 may generate the bet 145 according to the prediction 135.

A next value in the sequence of values is received at 309. The next value may be generated by the value generator 115 and provided to one or both of the prediction engine 130 and the client device 110. The client device 110 and/or the prediction engine 130 may receive a payoff depending on the failure or success of the bet 145.

The calculated deviation is updated using the received next value at 311. The deviation may be updated by the prediction engine 130. The updated deviation may be used by the prediction engine 130 to predict a next value to be generated by the value generator 115.

Figure 4:
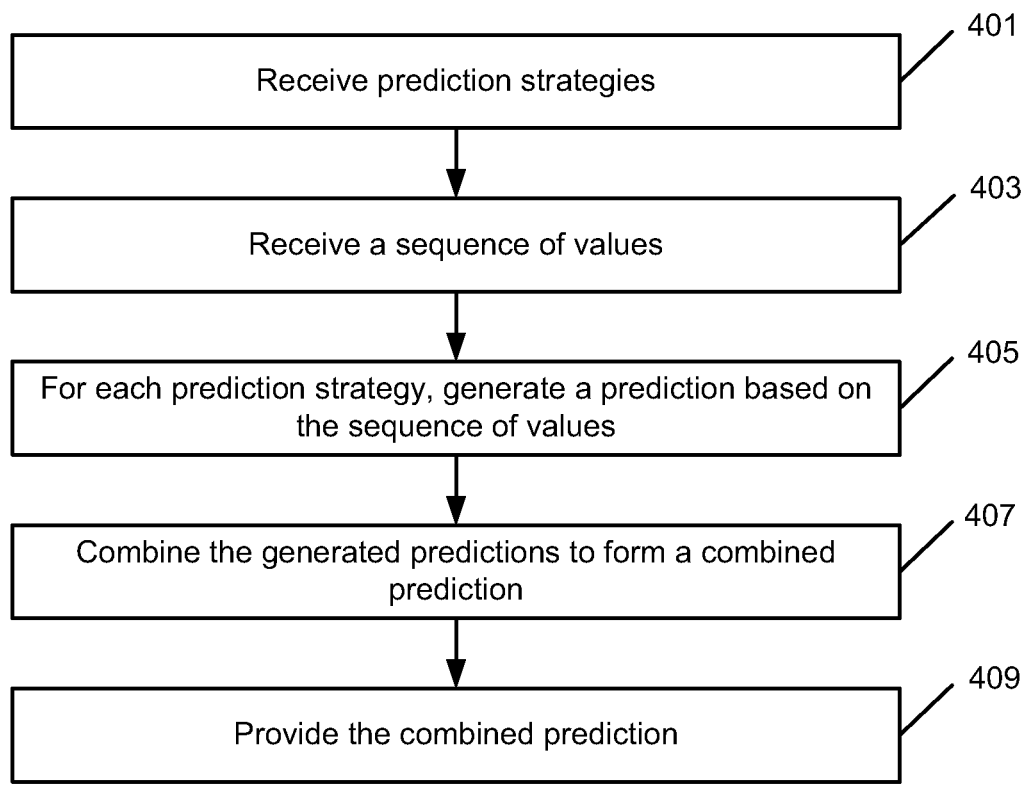
FIG. 4 is operational flow of an implementation of a method for predicting a next value in a sequence of values using a combination of predictions from a plurality of value prediction strategies.

FIG. 4 is operational flow of an implementation of a method 400 for predicting a next value in a sequence of values using a combination of predictions from a plurality of value prediction strategies. The method 400 may be implemented by the prediction engine 130, for example.

A plurality of prediction strategies are received at 401. The strategies may be received by the prediction engine 130 and stored in the strategy storage 165. Each strategy may be a strategy for predicting a next value to be generated by the value generator 115. The prediction engine 130 may use a strategy to generate a prediction 135. Each prediction may include a predicted next value and a confidence value for the predicted next value.

A sequence of values is received at 403. The sequence of values 116 may be received by the prediction engine 130 from the value generator 115. Each value in the sequence of values may have an associated time that indicates when the value in the sequence was generated. In some implementations, the values 116 in the sequence of values may be bit values. Other types of values may also be generated by the value generator 115.

For each value prediction strategy, a prediction is generated based on the received sequence of values at 405. The predictions may be generated by the prediction engine 130 using each strategy of the plurality of strategies from the strategy storage 165.

The generated predictions are combined to form a combined prediction at 407. The generated predictions may be combined by the strategy combiner 150 of the prediction engine 130. The combinations of predictions generated with each strategy may be a linear combination. The predictions may be combined using formula (3) described previously.

In some implementations, the strategy combiner 150 may combine the predictions by generating a binary tree with a leaf node for each prediction 135 generated using each strategy. The strategy combiner 150 may then recursively call formula (3) on the nodes of the binary tree until all of the predictions have been combined. Other methods for combining predictions may also be used.

The generated combined prediction is provided at 409. The combined prediction may be provided to a client device 110. The combined prediction 135 may then be used to generate a bet 145 on a next value to be generated by the value generator 115.

Figure 5:
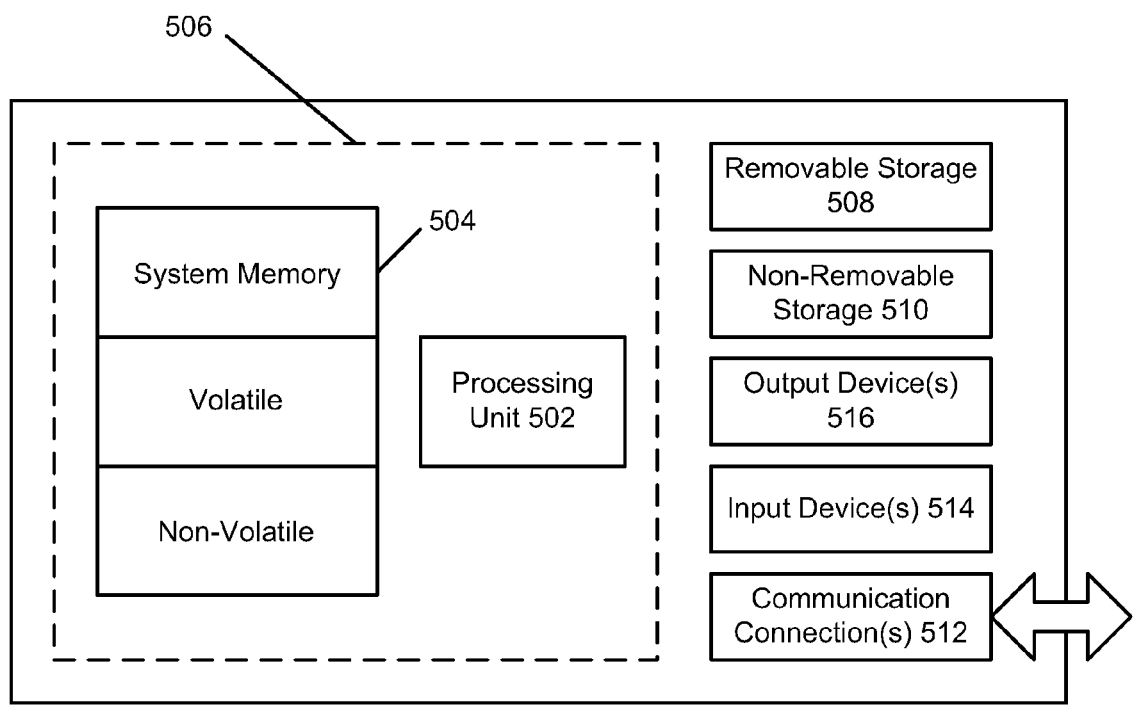
FIG. 5 shows an exemplary computing environment in which example embodiments and aspects may be implemented.

FIG. 5 shows an exemplary computing environment in which example embodiments and aspects may be implemented. An exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by computing device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a sequence of values by a computing device, wherein each value in the sequence of values has an associated time;
    determining a deviation of the values of the sequence of values based on the time associated with each value by the computing device;
    selecting a confidence function from a plurality of confidence functions by the computing device;
    generating a prediction based on the determined deviation and the selected confidence function by the computing device, wherein the prediction comprises a predicted next value in the sequence of values and a confidence value;
    providing the prediction by the computing device; and
    generating a bet on the next value in the sequence of values according to the prediction, wherein an amount of the bet is proportional to the confidence value.

2. The method of claim 1, wherein determining the deviation of the values of the sequence of values based on the time associated with each value comprises determining a geometric sum of the values.

3. The method of claim 2, wherein each value in the geometric sum is weighted based on the time associated with the value and a discount factor.

4. The method of claim 1, wherein the confidence function is a continuous odd function.

5. The method of claim 1, wherein the values in the sequence of values are bit values.

6. The method of claim 1, further comprising:
    receiving a next value in the sequence of values; and
    updating the deviation using the received next value.

7. A method comprising:
    receiving a plurality of prediction strategies at a computing device;
    receiving a sequence of values at the computing device;
    selecting a confidence function from a plurality of confidence functions by the computing device;
    for each prediction strategy from the plurality of prediction strategies, generating a prediction based on the sequence of values by the computing device;
    combining the generated predictions to form a combined prediction using the selected confidence function by the computing device;

providing the combined prediction by the computing device; and generating a bet on a next value in the sequence of values according to the combined prediction by the computing device, wherein an amount of the bet is proportional to a confidence value of the combined prediction.

8. The method of claim 7, wherein combining the plurality of predictions to form the combined prediction using the selected confidence function comprises:

generating a tree comprising a plurality of leafs, wherein each leaf corresponds to a prediction from the plurality of predictions; and recursively combining the predictions associated with each leaf to form the combined prediction using the selected confidence function.

9. The method of claim 7, wherein the values are bit values.

10. A system comprising:

at least one computing device; and a prediction engine adapted to:

select a confidence function from a plurality of confidence functions;

determine a deviation of a plurality of values of a sequence of values based on a time associated with each of the plurality of values;

generate a prediction based on the deviation and the confidence function, wherein the prediction comprises a next value in the sequence of values and a confidence value; and generate a bet on the next value according to the prediction, wherein an amount of the bet is proportional to the confidence value of the prediction.

11. The system of claim 10, wherein the prediction engine is adapted to determine a geometric sum of the values.

12. The system of claim 11, wherein each value in the geometric sum is weighted based on the time associated with the value and a discount factor.

13. The system of claim 10, wherein the prediction engine is adapted to generate the prediction based on the deviation and a prediction strategy.

14. The system of claim 10, wherein the prediction engine is further adapted to generate a plurality of predictions based on the deviation and a plurality of prediction strategies, and to combine the plurality of predictions into a combined prediction.

15. The system of claim 14, wherein the prediction engine is further adapted to generate the bet on the next value in the sequence of values according to the combined prediction.

16. The system of claim 10, wherein the prediction engine is further adapted to:

receive a next value in the sequence of values; and update the deviation using the received next value.

* * * * *